Dec. 2, 1952     E. THYS     2,620,064
HOP STEM REMOVER
Filed Oct. 18, 1949     2 SHEETS—SHEET 2

Inventor
Edouard Thys
By Corbin & Webster
ATTORNEYS

Patented Dec. 2, 1952

2,620,064

UNITED STATES PATENT OFFICE 2,620,064

HOP STEM REMOVER

Edouard Thys, Sacramento, Calif.

Application October 18, 1949, Serial No. 122,037

3 Claims. (Cl. 209—12)

This invention is directed to, and it is an object to provide, a novel apparatus for removing free stems or twigs from hops during the course of processing the latter after harvest; the hops having been detached from but remaining intermingled with such stems or twigs.

Another object of the invention is to provide a hop stem remover which is operative to remove both forked or crooked and straight stems from the hops; straight stems being the most difficult to separate from the hops.

A further object of the invention is to provide a hop stem remover which includes a novel assembly of a table, a foraminous conveyor having a run thereof working along the top of the table, and a feeder positioned to deliver mixed hops and stems or twigs on the conveyor; the stems or twigs remaining on the conveyor, while the hops pass through the foraminations onto the table, whence they feed to one edge of the latter and discharge downwardly therefrom.

An additional object of the invention is to provide a hop stem remover wherein both the table, and the conveyor, have novel embodiments operative to produce rapid and effective removal of stems or twigs from the detached hops.

It is also an object of the invention to provide a hop stem remover which is relatively simple in structure, being designed for ease and economy of manufacture; the apparatus having no parts requiring other than normal maintenance or repair.

Still a further object of the invention is to provide a practical and reliable hop stem remover, and one which will be exceedingly effective for the purpose for which it is designed.

These objects are accomplished by means of such structure and relative arrangement of parts as will fully appear by a perusal of the following specification and claims.

Figure 1:
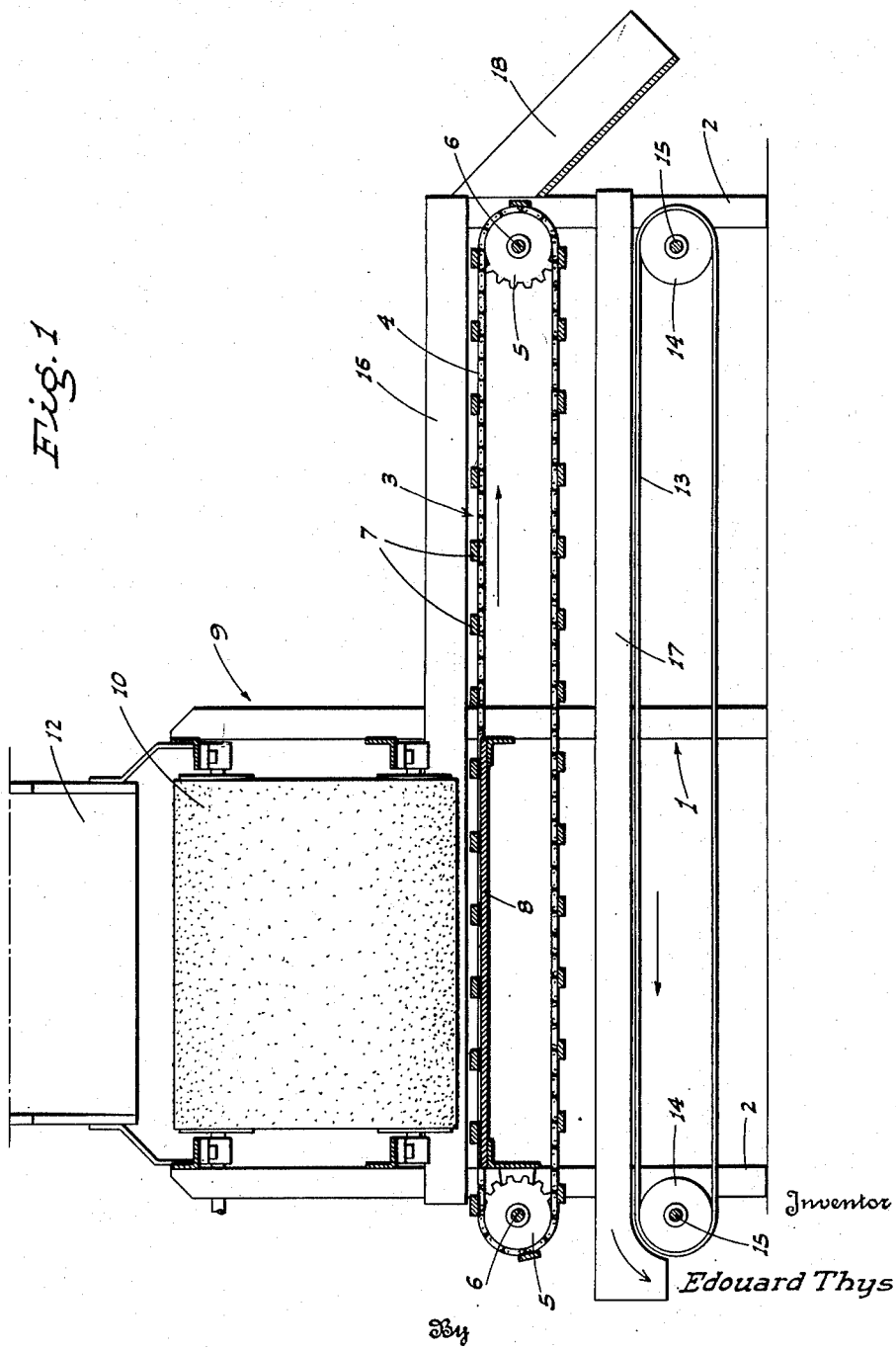
Fig. 1 is a side elevation of the hop stem remover.
Figure 2:
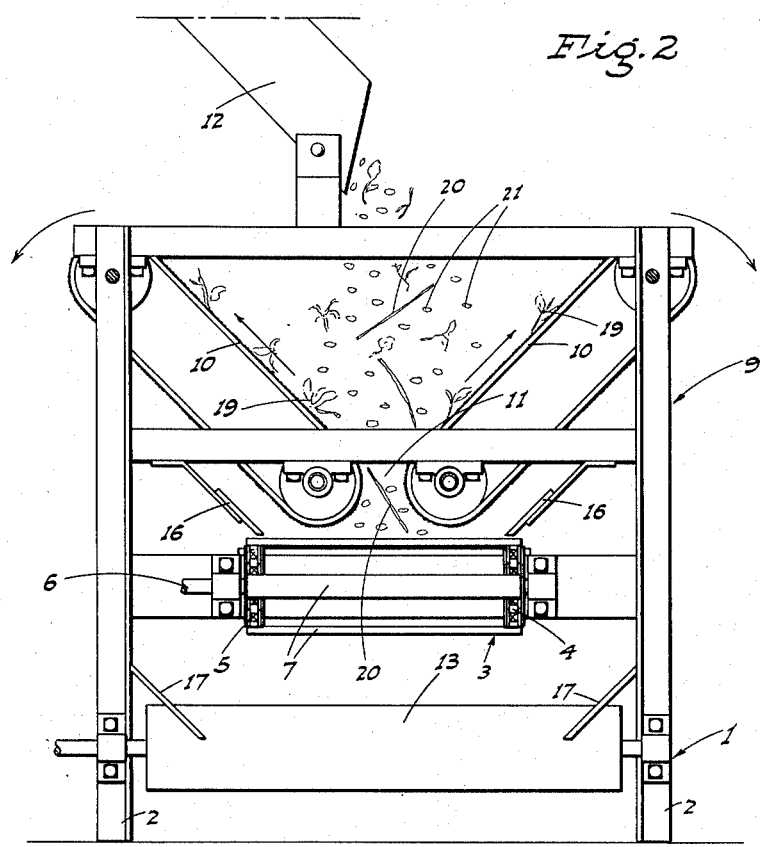
Fig. 2 is an end elevation of the apparatus taken from the feed end thereof.

Referring now more particularly to the characters of reference on the drawings, and at present to Figs. 1 and 2, the hop stem remover comprises an upstanding horizontal main frame 1 of elongated construction; such main frame including transversely spaced end legs 2.

Adjacent the top thereof the main frame 1 is fitted with an endless, stem carry-off conveyor of foraminous type, such conveyor being indicated generally at 3, and including transversely spaced, endless chains 4 trained at the ends over sprockets 5 on cross shafts 6. The cross shafts 6 are journaled in connection with adjacent ones of the end legs 2, and one of said cross shafts is driven by suitable means (not shown), to the end that the upper run of the endless conveyor 3 travels in the direction indicated by the arrow in Fig. 1.

The endless, foraminous conveyor 3 includes a multiplicity of cross bars 7 secured between the endless chains 4 in equi-distantly spaced relation; the space between adjacent cross bars 7 being less than the average length of the hop stems which are to be removed, but of course greater than the size of free hops.

At the initial or lead portion thereof the upper run of the endless conveyor 3 engages and travels along the top surface of a horizontal table 8 fixed in the main frame 1; such table being of a length substantially half that of the endless conveyor 3.

A vertical skeleton frame 9 upstands rigidly from the main frame 1 above the table 8, and such vertical frame 9 provides the mount for a pair of relatively short endless conveyors 10. The endless conveyors 10 are disposed to run in a transverse plane with respect to the endless conveyor 3, extending in upwardly and laterally outwardly diverging relation.

At their lower ends the endless conveyors 10 are close to, but spaced from, the upper run of the endless conveyor 3, and are disposed so that a transversely relatively narrow throat 11, compared to the average length of straight hop stems, is formed between said conveyors 10 at the bottom turn thereof.

The conveyors 10 are driven so that the diverging, upper runs thereof move in an upward direction, as indicated by the arrows in Fig. 2; such endless conveyors 10 being of a width approximating the length of the table 8.

A chute 12 is mounted centrally above the endless conveyors 10 and is adapted to discharge onto the same.

Below the endless conveyor 3, the main frame 1 is fitted with an endless belt conveyor 13 which extends in the same direction but travels oppositely; said endless belt conveyor 13 including end rollers 14 on cross shafts 15 journaled in connection with the corresponding end legs 2; one of said cross shafts 15 being driven by suitable means (not shown).

Both the endless conveyors 3 and 13 have upstanding longitudinal side boards 16 and 17 associated therewith, whereby to prevent of escape of material laterally from said conveyors. Additionally, the endless conveyor 3 discharges from its upper run into a chute 18.

When the above described apparatus is in use, the detached hops, together with free stems or twigs, are fed from the chute 12 downwardly onto the inclined endless conveyors 10; the stems or twigs which are forked or crooked readily catching on the upper runs of the conveyors 10, for the reason that the material which surfaces said conveyors is of very rough texture. A stem so caught is shown, for example, at 19, and the caught stems feed upwardly on the upper runs of the conveyors 10 and discharge laterally of the apparatus over the upper ends of said conveyors, as indicated by the arrows in Fig. 2.

However, straight stems, as for example at 20, do not readily catch on the conveyors 10, and thus feed with the free or loose hops 21 through the transversely relatively narrow throat 11, falling onto the upper run of the foraminous endless conveyor 3.

As the straight stems 20 have considerable longitudinal directional disposition imparted thereto as they fall through the throat 11, such stems—as they drop onto the upper run of the conveyor 3—lie on or span between the cross bars 7.

At the same time the free hops 21 pass between such cross bars 7 and lie on the horizontal table 8. Thereafter, as the upper run of the endless conveyor 3 travels forwardly, the hops are swept along the table 8, discharging over the front edge of the latter and falling onto the endless belt conveyor 13. The stems which rest on or span between the cross bars 7 do not so fall, and continue to travel forwardly with the upper run of the endless conveyor 3, ultimately discharging into the chute 18.

In the above manner the apparatus is operative to accomplish an effective removal of the stems or twigs, both crooked or hooked, and straight, from the free hops.

Figure 3:
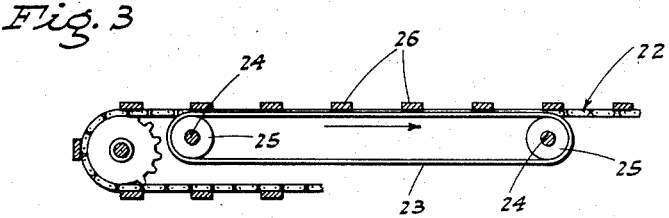
Fig. 3 is a fragmentary longitudinal sectional elevation showing a modification of the table.

Under certain working conditions it may be desirable that the table be of traveling type, and under such circumstance the structure shown in Fig. 3 is employed. Here the endless foraminous conveyor, corresponding to the conveyor 3 of Fig. 1, is shown at 22. In lieu of the horizontal table 8, as before, the table comprises a relatively short, endless belt conveyor 23 including cross shafts 24 and drums 25; said cross shafts being journaled in suitable manner on the main frame 1.

The endless belt conveyor 23 is mounted so that its upper run travels in the same direction, and at substantially the same speed, as the upper run of the endless foraminous conveyor 22; said upper runs traveling in close engagement.

When this embodiment of the apparatus is in use, the stems or twigs fall onto, and are carried along by, the upper run of the foraminous conveyor 22; the free hops falling through onto the upper run of the endless belt conveyor 23, traveling with the same to the point of discharge, and then falling onto the endless belt 13 as before.

The advantage of this embodiment over the fixed table, as in Fig. 1, is the fact that the hops are not swept along the table by the cross cleats 26 of the upper run of the endless foraminous conveyor 22, preventing bruising or breaking of the hop berries.

Figure 4:
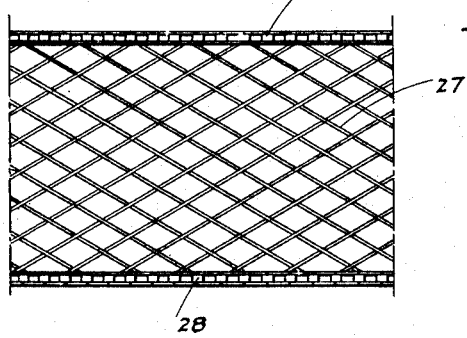
Fig. 4 is a fragmentary plan view showing a modification of the foraminous conveyor.

In Fig. 4 there is illustrated a modification of the endless foraminous conveyor which may be used in lieu of the conveyor 3. Under some conditions of feeding of the admixed stems or twigs and hops, a conveyor with smaller or more restricted foraminations is desirable. In this modification the endless foraminous conveyor is of endless, flexible mesh, as at 27, with the mesh secured to, and spanning between, the endless chains 28 which the conveyor includes. The flexible mesh type foraminous conveyor, as in Fig. 4, may be used in the apparatus in conjunction with either a fixed table, as at 8 in Fig. 1, or a moving table, as at 23 in Fig. 3; such mesh type conveyor functioning in substantially the same manner as heretofore described.

The hop stem remover, in any of its embodiments, provides a very practical and reliable apparatus for the intended purpose.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A free hop and stem separator comprising an upstanding main frame, a longitudinal endless conveyor mounted on the main frame, such conveyor having openings larger than the size of free hops but smaller lengthwise of the conveyor than the length of hop stems, an upwardly facing table mounted in the main frame and the upper run of the conveyor sweeping thereon, the forward edge of the table being short of the corresponding end of said conveyor, a pair of endless belt conveyors mounted in connection with the frame and the table and the corresponding portion of the upper run of the first named conveyor, said pair of endless conveyors being disposed with their adjacent runs moving upwardly and in upwardly and laterally outwardly diverging relation, the lower ends of said pair of endless conveyors terminating close to the endless conveyor and being closely spaced whereby to form a throat therebetween wider than free hops but narrower than the length of hop stems and extending lengthwise of the first named conveyor, and means to feed mixed stems and free hops into the V-space between said pair of endless conveyors; the working surface of said pair of endless conveyors being of rough texture.

2. A free hop and stem separator comprising a main frame, an endless substantially horizontal open-work conveyor mounted on the frame, a table mounted on the frame directly under and swept by the upper run of the conveyor, the discharge end of the table being short of the discharge end of the conveyor, the latter including longitudinally spaced cross bars whereby to provide openings relatively narrow lengthwise of the conveyor but of sufficient width to receive free hops therebetween, and means to feed mixed stems and free hops onto the conveyor directly above the table and including a throat wider than the hops but narrower than the length of stems, and disposed to impart to the stems a longitudinal disposition crosswise of the bars and openings therebetween.

3. A free hop and stem separator comprising a main frame, an endless substantially horizontal open-work conveyor mounted on the frame, a table mounted on the frame directly under and swept by the upper run of the conveyor, the discharge end of the table being short of the discharge end of the conveyor, the latter including means forming openings of sufficient size to pass hops therethrough but of lesser size in one direction than the length of hop stems, means forming a relatively narrow throat of sufficient width to pass hops but of lesser width than the length of hop stems, said throat being disposed close to the conveyor directly above the table and extending lengthwise of said one direction of the conveyor openings, said throat having upwardly moving and rough-surfaced diverging side walls, and a hopper to discharge mixed stems and free hops into the throat from above.

EDOUARD THYS.

REFERENCES CITED

The following references are of record in the file of this patent:

UNITED STATES PATENTS

| Number | Name | Date |
|---|---|---|
| 10,212 | Peterson | Nov. 8, 1853 |
| 47,746 | Palmer | May 16, 1865 |
| 113,345 | Reike | Apr. 4, 1871 |
| 236,192 | Stillman | Jan. 4, 1881 |
| 566,173 | Hemingway | Aug. 18, 1896 |
| 672,981 | Jessup | Apr. 30, 1901 |
| 859,933 | Evan | July 16, 1907 |
| 1,132,011 | Horst | Mar. 16, 1915 |
| 1,442,526 | Hungerford | Jan. 16, 1923 |
| 2,139,029 | Miller | Dec. 6, 1938 |
| 2,475,823 | Davenhauer | July 12, 1949 |

FOREIGN PATENTS

| Number | Country | Date |
|---|---|---|
| 332,927 | Great Britain | July 30, 1930 |